United States Patent [19]

Bickford

[11] Patent Number: 5,002,327
[45] Date of Patent: Mar. 26, 1991

[54] DASHBOARD AND SIDE WINDOW MOUNTED REFLECTED GLARE SHIELD

[76] Inventor: Norman F. Bickford, 628 Jaeger Dr., Delray Beach, Fla. 33444

[21] Appl. No.: 410,806

[22] Filed: Sep. 22, 1989

[51] Int. Cl.⁵ .............................................. B60J 3/02
[52] U.S. Cl. .................................... 296/97.7; 296/97.8
[58] Field of Search ................... 296/97.1, 97.7, 97.8, 296/97.9; 160/370.2, DIG. 3

[56] References Cited

U.S. PATENT DOCUMENTS

| | | | |
|---|---|---|---|
| 2,187,027 | 1/1940 | Harvey | 296/97.7 |
| 2,253,766 | 8/1941 | Crowell | 296/97.7 |
| 2,445,473 | 7/1948 | Constant . | |
| 2,501,250 | 3/1950 | Wilson | 296/97.7 |
| 2,596,836 | 5/1952 | Bruhl | 296/97.7 X |
| 2,665,166 | 1/1954 | Roark | 296/97.9 |
| 2,813,749 | 11/1957 | Wetig | 296/97.7 |
| 3,003,812 | 10/1961 | Haugland | 296/97.7 |
| 3,042,445 | 7/1962 | Lamar | 296/97.7 |
| 3,804,456 | 4/1974 | Boyle | 296/97.7 |
| 4,005,899 | 2/1977 | Rigney | 296/97.7 |
| 4,065,171 | 12/1977 | Nagy | 296/97.7 |
| 4,105,246 | 8/1978 | Trumbull | 296/97.7 |
| 4,708,388 | 11/1987 | Zacharczuk | 296/97.7 |

FOREIGN PATENT DOCUMENTS

| | | | |
|---|---|---|---|
| 954561 | 9/1974 | Canada | 296/97.7 |
| 94952 | 7/1960 | Netherlands | 296/97.1 |

*Primary Examiner*—Margaret A. Focarino
*Assistant Examiner*—Gary C. Hoge

[57] ABSTRACT

A dashboard or side window mounted direct or reflected glare shield to be positioned within the passenger compartment of a motor vehicle either adjacent to the windshield or attached to a vehicle door frame via a holder to absorb and intercept light rays or reflected glare. The glare shield is formed of a thin sheet, like cardboard that is inscribed with horizontal fold lines and reinforced with several malleable wires that are inserted into the sheet vertically thus allowing the user to adjust the shield as desired for use so that it will hold the shape into which it is molded until it is readjusted. The shield may be inscribed with markings that are kept covered with a dark material that can be removed so that the shield may be used as an emergency road sign.

3 Claims, 9 Drawing Sheets

DASHBOARD AND SIDE WINDOW MOUNTED REFLECTED GLARE SHIELD

(A) BACKGROUND OF THE INVENTION

This invention relates to a means for arresting direct sun rays and reflected glare from sun or other light sources shining through transparent windshields and/or side windows of motor vehicles, airplanes, motor boats or other vehicle bodies so as to prevent the driver or person occupying a seat adjacent to a vehicle door window being subjected to annoyance or discomfort from direct sunlight or reflected glare either while the vehicle is traveling or when it is stopped.

(B) DESCRIPTION OF THE PRIOR ART

Devices for shielding the interior and occupants of a vehicle against sunlight and reflected glare that are used in association with the windshield or side door windows have been known in the past. Today's automobiles are provided with sun visors to intercept and block overhead rays of the sun so that they do not interfere with the visibility or comfort of the driver and vehicle passengers. Still other shields have been developed for use in the windshield to intercept light rays. Crowell U.S. Pat. No. 2,253,766, (11/27/39) developed an eye protecting means for vehicles to protect the driver or a front seat passenger from rays of light that may be used when the vehicle is being used. Shades have been developed that attach semipermanently to the side windows to block sun rays that may be used when a vehicle is parked. Roark, U.S. Pat. No. 2,665,166 (8/20/51), developed a permanently attached car-side sun visor that was permanently mounted on a vehicle door frame. Nagy, U.S. Pat. No. 4,065,171 (12/27/77) developed an adjustable free-standing glare shield adapted to be positioned adjacent to the windshield of an automobile without impairing the vision of the driver. However, no free-standing or easily attached shield has been developed that is adapted to be used interchangeably in the windshield or side door windows of a vehicle or mounted in a position so as to protect the arm of the driver that is closest to the vehicle door prior to this patent or that can be mounted so as to protect the arm of the driver on the side closest to the door and that will remain in a flexed position when so adjusted.

SUMMARY OF INVENTION

The purpose of this invention is to provide a device adapted primarily for association with the windshields and/or side windows of motor vehicles to prevent direct or indirect sun rays from shining on the lap, arms or face of occupants on the front seat of the vehicle.

An additional objective of the invention is in providing a simple and convenient device whereby the driver or occupant of a motor vehicle can easily adjust the rectangular shield within the vehicle body, so as to assume positions at various angles upwardly or downwardly and laterally as required to prevent direct sun rays and reflected glare from impairing the vision of the driver and occupants.

A still further object of the invention resides in the provision of a sun and reflected glare arresting device for motor vehicles that is inexpensive to manufacture, simple in construction and operation, does not require a permanent attachment to the motor vehicle and is highly efficient for the purposes intended.

The embodiment of the invention herein disclosed is merely illustrative, and may be modified and departed from in noninventive ways without departing from the scope of the invention as pointed out hereinafter and limited solely by the appended claims.

To the attainment of the above stated objects and others, which will appear as the features of novelty of the invention are better understood, the invention further resides in the novel features of construction, arrangement, combination and association of parts, a practical embodiment of which is disclosed by the accompanying drawings. The shield holder is only used in association with the side window application of the dashboard or side window mounted reflected glare shield.

BRIEF DESCRIPTION OF DRAWINGS

Referring to the drawings forming a part of this specification, and wherein like characters of reference denote similar parts through the several views, there are two components that perform the necessary function of dashboard or side window mounted reflected glare shield: shield holder and shield.

DETAILED DESCRIPTION OF THE PREFERRED EMBODIMENTS

The present invention, is described with reference to each of the Figures.

Figure 1:
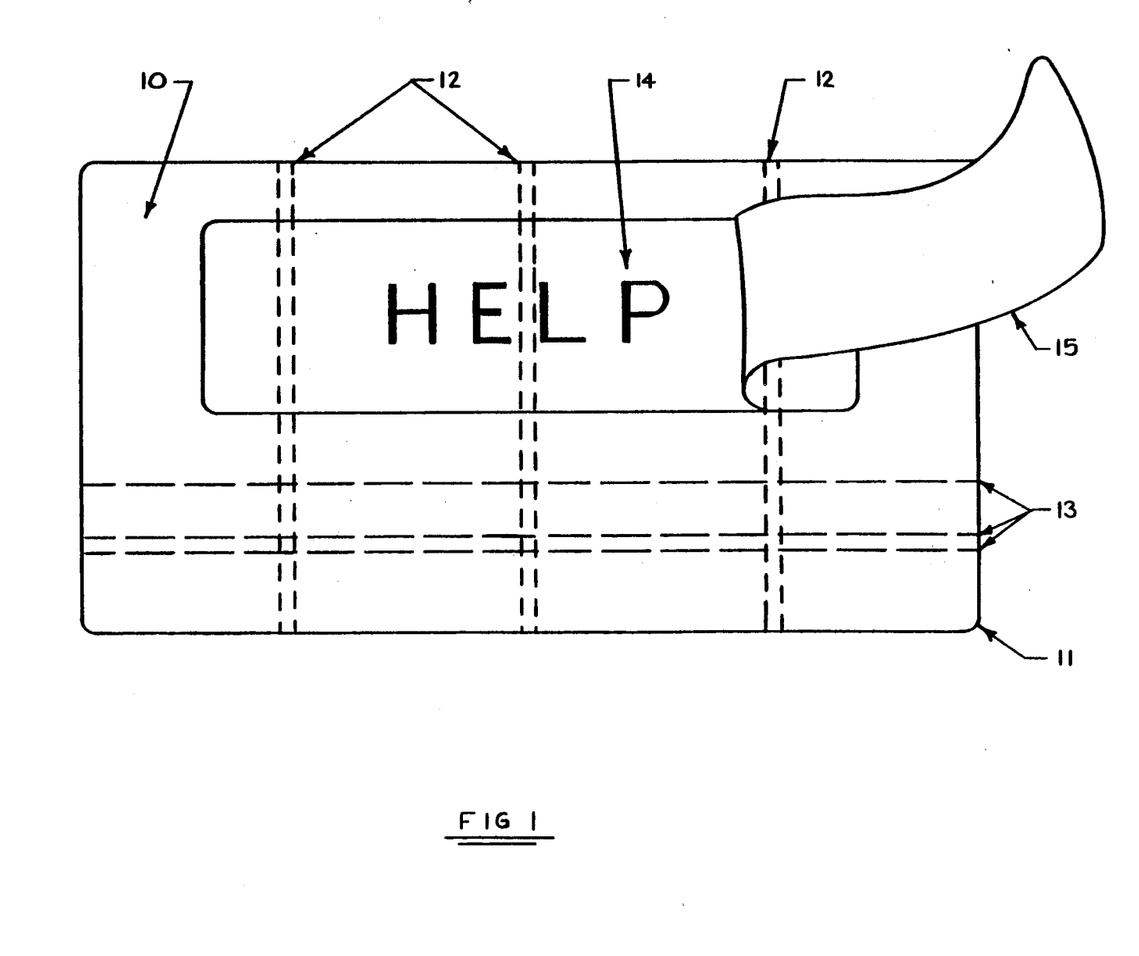
FIG. 1 is an elevation showing the construction of the dashboard or side window mounted reflection glare shield.
Figure 9:
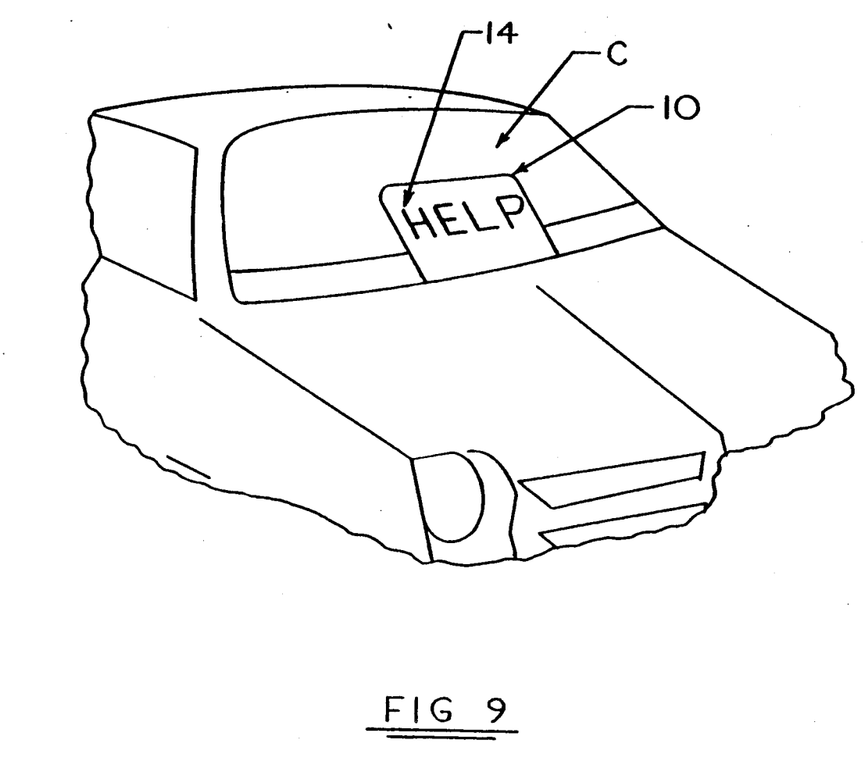
FIG. 9 is a front elevation of the dashboard or side window mounted reflected glare shield placed in position inside the windshield with the covering material removed, revealing the fluorescent symbols.

FIG. 1 shows the construction of the dashboard or side window mounted reflected glare shield. The shield is shown as comprising of a rectangular shaped flat piece of material such as corrugated cardboard (10) with rounded corners (11). Three separate thin malleable wires (12) are inserted vertically through the shield in such a manner as to be invisible. The wires (12) allows the shield to retain the position to which it is bent by the user. The back side of the shield has printed lines (13) to show where it should be scored for folding to accommodate the line of vision of the driver according to his or her height. The shield's surfaces are completely covered with a dark color, so that they will not be reflected in the windshield. Letters or symbols (14) are printed on the front side of the shield in 5 inch or larger letters of a reflective color. The symbols are covered with a piece of dark material (15) which is temporarily adhered to the surface of the shield when the shield is used as a protection from sunlight or glare as shown in FIG. 1. When required, the material can be peeled away to reveal the message and the shield placed where desired so as to be seen by passing motorists as shown in FIG. 9.

Figure 2:
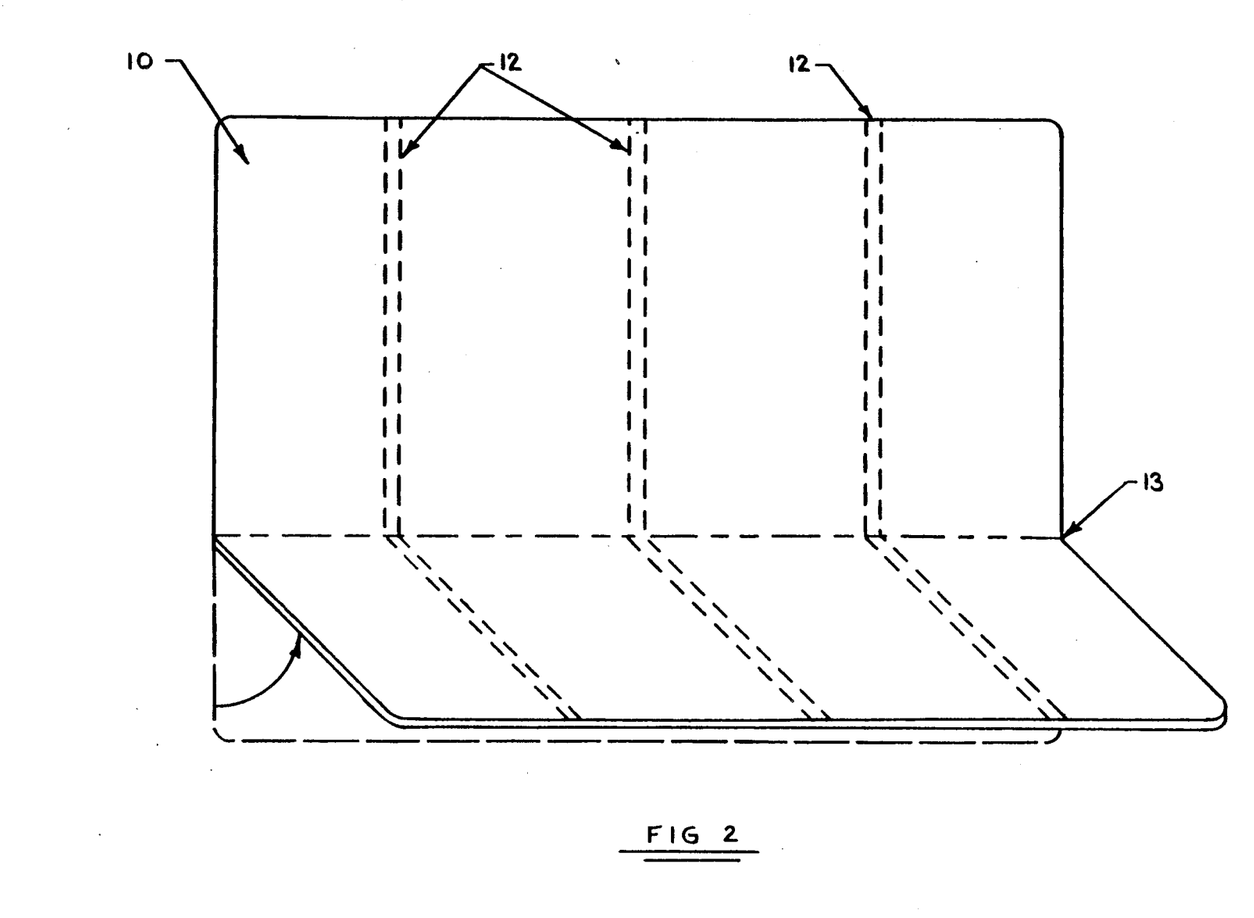
FIG. 2 is an elevation showing the dashboard or side window mounted reflected glare shield adjusted in a flexed position.

FIG. 2 shows the shield (10) is scored and bent along one of the lines printed on it's inside surface (13). The wires inserted into the shield (12) enable the shield to retain the shape to which it is adjusted, wherever it is positioned.

Figure 3:
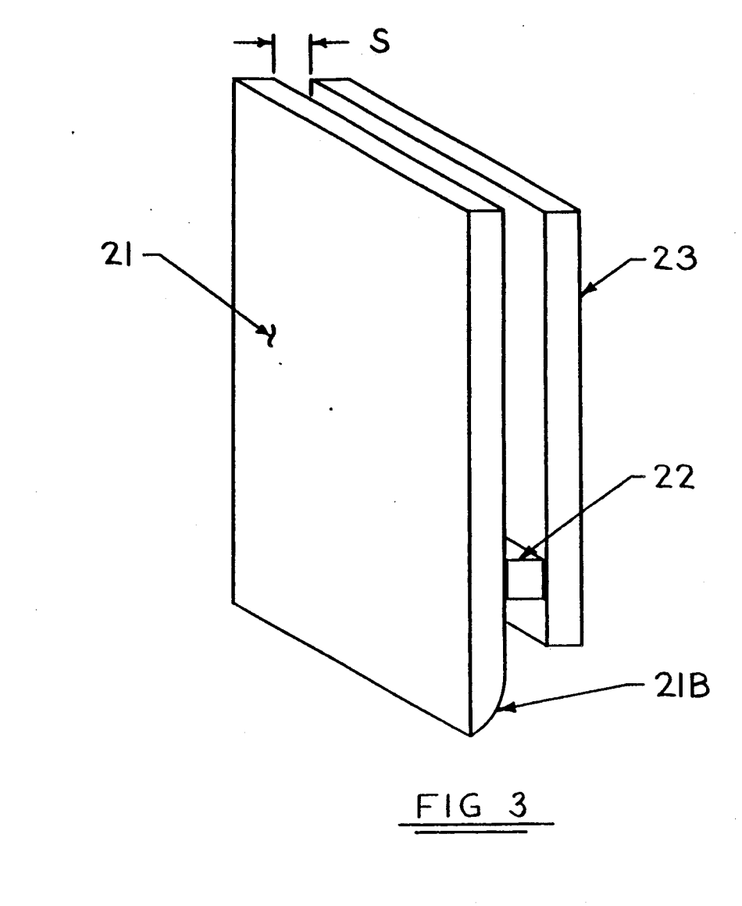
FIG. 3 is an elevation showing the construction of the shield holder, shown as an independent necessary component of the invention.

FIG. 3 shows the construction of the shield holder, referred to as 31h. The shield holder is constructed of flat, light but rigid material such as plastic. It is made up of a long rectangular flat piece (21) that has a bevel on the lower end (21b), a spacer bar (22) and a smaller flat piece (23). The large piece (21) is bonded to the bar (22) at it's center; so that the large piece (21) extends on both sides, top and bottom from the bar. The beveled end (21b) of the large piece is placed so as to project downward. Also attached to the bar (22) is a second piece (23) that is attached at the bottom to the bar (22) and projects to the same height as the first piece (21) so that a slot (S) is formed to accommodate the shield (11). Numerous configurations of the shield holder may be employed in practicing the present invention.

Figure 4:
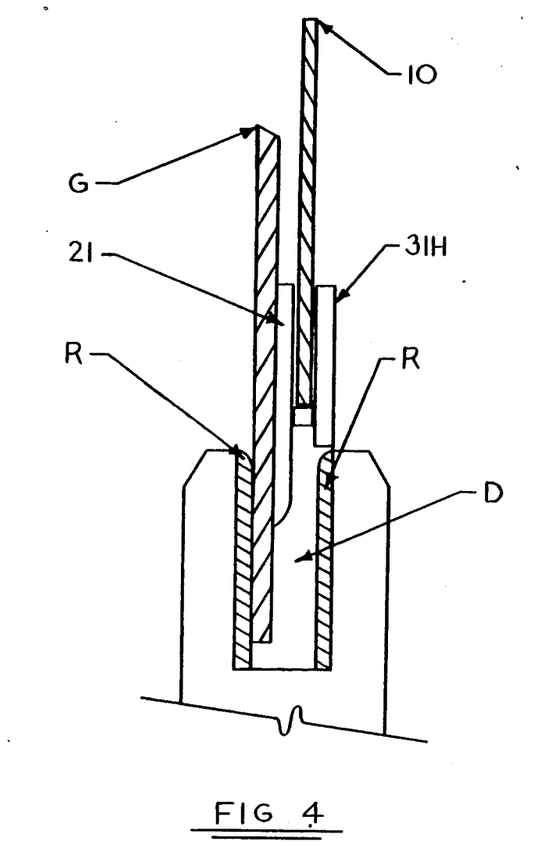
FIG. 4 is a fragmented, cross sectional view showing how the shield is mounted in the holder which is mounted in the motor vehicle door window slot.

FIG. 4 shows how the shield holder (31h) will fit into a vehicle door window frame slot (D) with the long flat piece (21) side against the inside window glass (G). The long flat piece (21) slides between the rubber window support gasket (R) and the window glass (G) as shown. This mount will accommodate the shield and hold it snugly in place in a horizontal or vertical position. It will also allow it to be adjusted for maximum unobstructed view and shade by lateral or various angles upwardly or downwardly to suit the driver and occupants.

Figure 5:
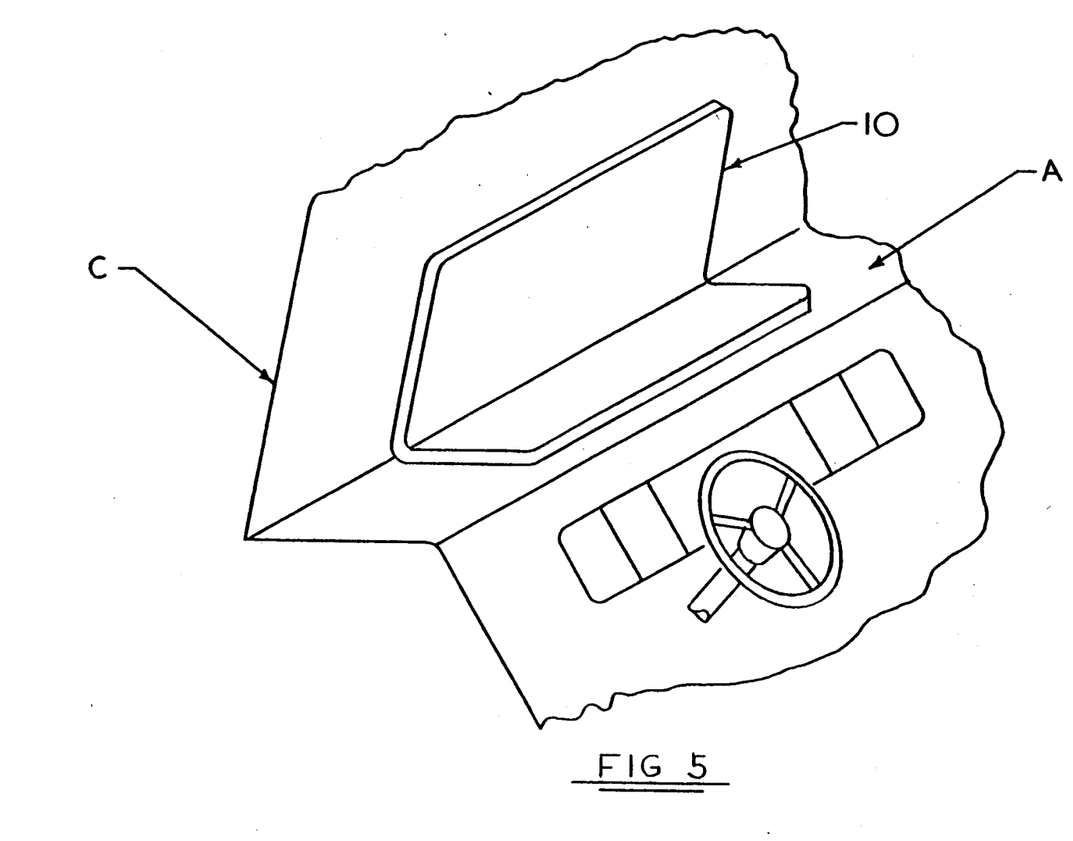
FIG. 5 is a view, in perspective, of a cut away of a windshield structure showing 10 the shield placed against the windshield and resting on the dashboard cowling.

FIG. 5 shows the shield (10) as fitting snugly between the windshield (C) and the dashboard cowling (A) of a motor vehicle in such a way that the shield (10) is held in place by friction created by both the internal malleable wires (12) and scored-fold (13) referred to in FIG. 2. It also allows the shield to be shifted laterally for better effectiveness as required.

Figure 6:
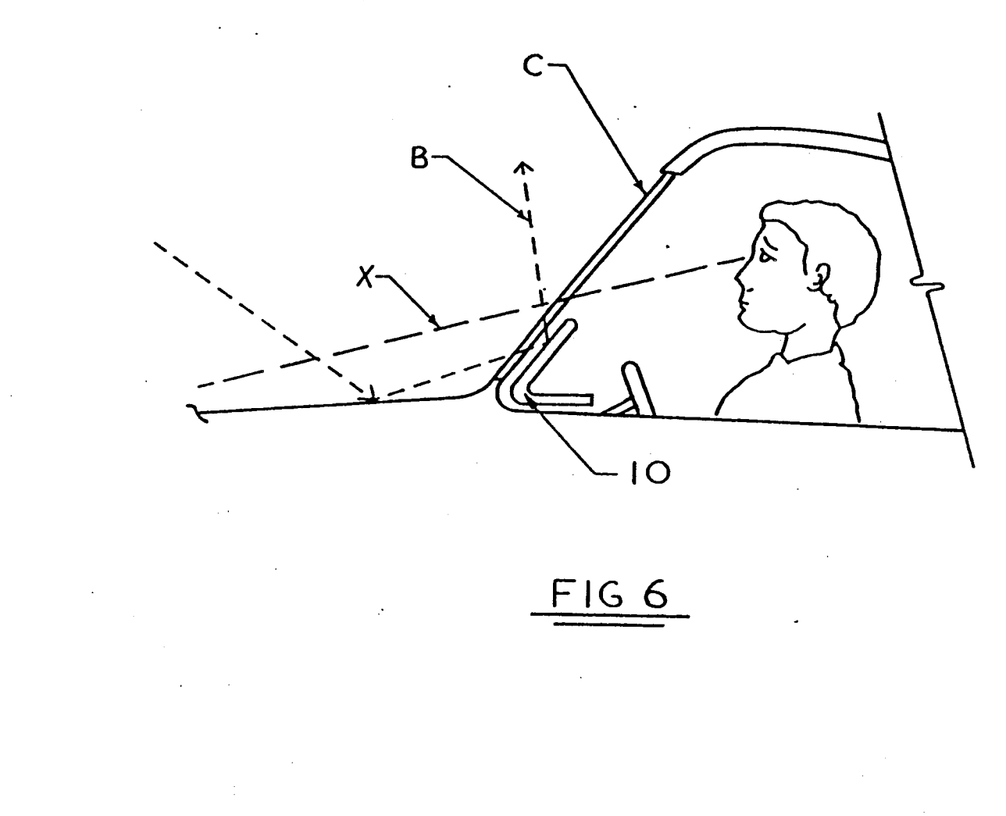
FIG. 6 is a fragmented perspective view showing the present invention as used on a vehicle dashboard to protect the driver from glare reflected from the hood of a motor vehicle.

FIG. 6 shows the dashboard or side window mounted reflected glare shield (10) mounted in the windshield (C) of a motor vehicle so as to provide a shield from reflected glare (B) without limiting the field of vision of the driver (X).

Figure 7:
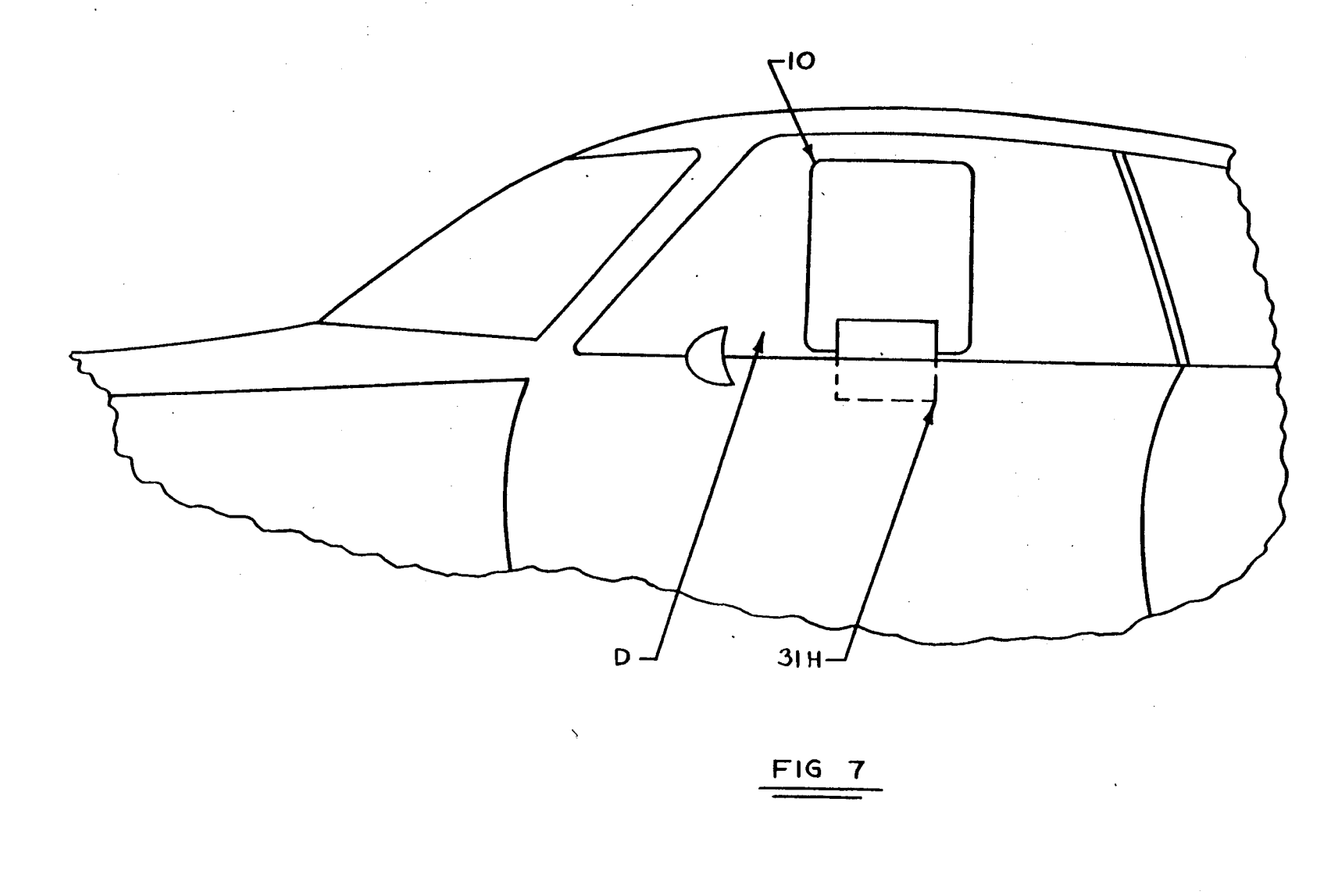
FIG. 7 is a side elevation of the dashboard or side window mounted reflected glare shield mounted in a shield holder that is mounted in the door window frame. In this instance, the dashboard or side window mounted reflected glare shield is mounted in a flat perpendicular position to provide maximum shield in a parked vehicle. The door window E is the standard roll down type window found universally used and moved with electric motors or hand cranked with inside and outside frames and rubber gaskets supporting the glass.

FIG. 7 shows the dashboard or side window mounted reflected glare shield (10), mounted in the side window opening (D) of a motor vehicle by inserting the shield holder into the window frame along the lowermost inside edge of the window opening. For this application, the operator places the shield (10) in the slotted shield holder (31h), see FIG. 3 (S) which allows lateral positioning of the shield for improved effectiveness.

Figure 8:
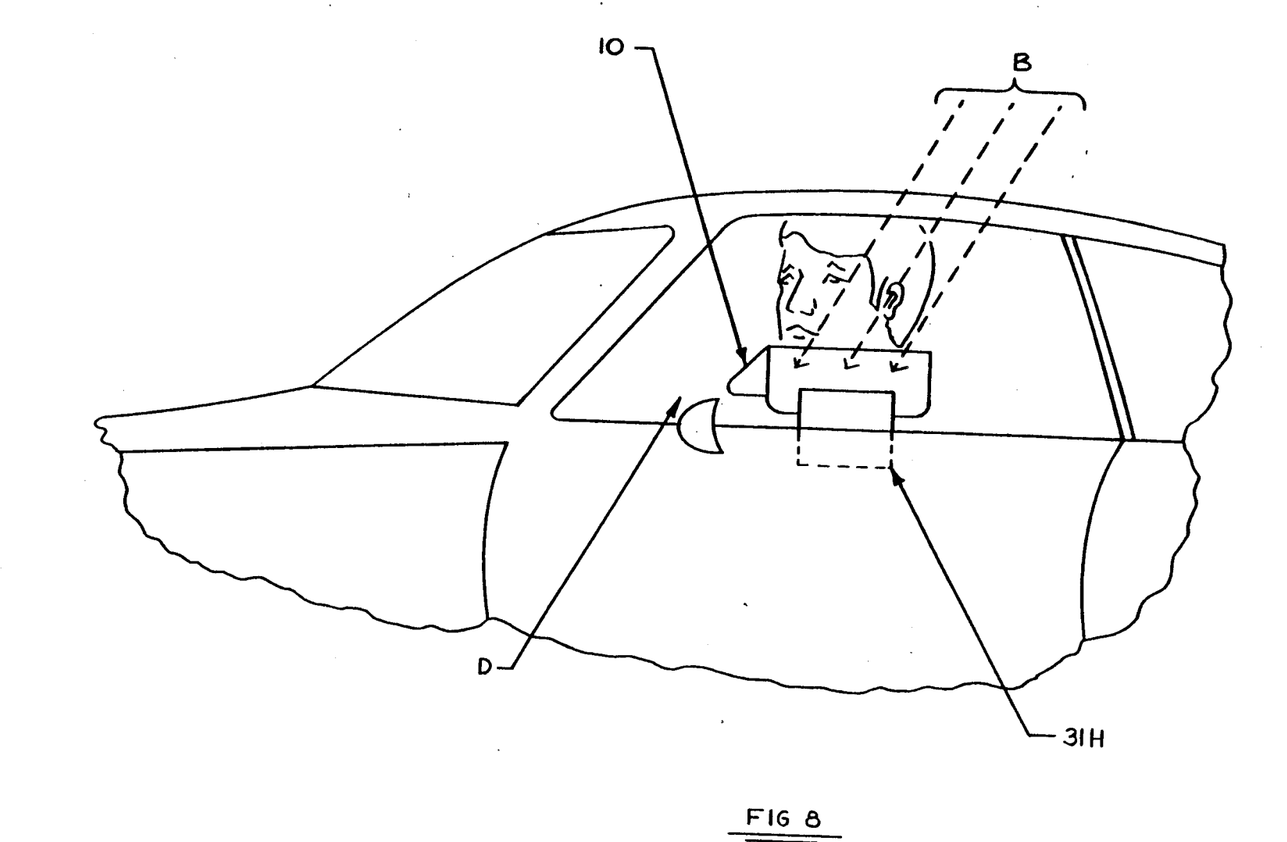
FIG. 8 is a side elevation of dashboard or side window mounted reflected glare shade in the door window frame. In this instance, the folded portion covers the arm of the driver on the left side, while allowing the driver to view the mirror mounted on the driver's side at all times.

FIG. 8 shows the shield (10) is alternately placed in a horizontal flexed orientation, mounted in the shield holder (31h) in the window (D), see FIG. 7, and adjusted to protect the arm of the driver from the sun. This is accomplished by bending the shield along the fold (13) as shown in FIGS. 1 and 2, which can be adjusted to allow the driver normal vision of the side rear view mirror. For the applications shown in FIGS. 7 and 8, the dashboard or side window mounted reflected glare shield can be attached to motor vehicles by merely inserting the shield holder (31h) in the window slot as shown in FIG. 7 and placing the shield (10) in a vertical, or folded horizontal position in the shield holder. Due to this simplified mounting capability, the dashboard or side window mounted reflected glare shield can be conveniently fitted on the side door windows of most existing motor vehicles of various designs and configurations. The broken lines in FIGS. 7 and 8 marked B refer to direct sunlight.

In FIG. 9, the dashboard or side window mounted reflected glare shield (10) is shown in an application as a sign to summon aid, placed in the windshield (C) of a motor vehicle with the symbols (14) exposed.

I claim:

1. A device for sun ray and glare protection in combination with a motor vehicle having a windshield and a dashboard cowling, comprising an elongated thin flat rectangular shield, said shield including means facilitating bending said shield along a horizontal axis in which the improvement comprises internal stiffening means inserted into said shield for retaining said shield in a bent position, whereby said shield is positioned between said windshield and said dashboard cowling and adjusted by said means facilitating bending to block incoming sun rays and glare.

2. A sun ray and glare protection device as recited in claim 1 wherein the internal stiffening means consists of at least one malleable wire inserted in the shield at an angle substantially perpendicular to said horizontal axis.

3. A sun ray and glare protection device as recited in claim 2 further comprising:
   (a) markings that indicate an axis along which the device is bent;
   (b) wherein the device is constructed of a semi-rigid material;
   (c) wherein the device has a dark non-reflective coating on a front surface and a back surface thereof;
   (d) wherein there are reflective letters on said front surface;
   (e) the device further includes a panel of a dark, non reflective material for removably covering the said letters.

* * * * *